United States Patent [19]

Ohwaki

[11] 3,772,467

[45] Nov. 13, 1973

[54] SYSTEM FOR CUTTING AND RECORDING ON A RECORD DISC

[75] Inventor: Isao Ohwaki, Tokyo, Japan

[73] Assignee: Victor Company of Japan, Ltd., Yokohama, Japan

[22] Filed: June 22, 1971

[21] Appl. No.: 155,575

[30] Foreign Application Priority Data

June 27, 1970 Japan .............................. 45/56240

[52] U.S. Cl. 179/100.4 ST, 179/1 GQ, 179/100.4 C, 179/100.4 M

[51] Int. Cl. ......................... G11b 3/00, G11b 3/74

[58] Field of Search ............ 179/100.4 ST, 100.4 C, 179/100.4 D, 100.1 TD, 100.4 M, 1 GQ

[56] References Cited

UNITED STATES PATENTS

| | | | |
|---|---|---|---|
| 3,067,292 | 12/1962 | Minter et al. .............. | 179/100.4 ST |
| 3,401,237 | 9/1968 | Takayanagi ................ | 179/100.4 ST |
| 3,632,886 | 1/1972 | Scheiber..................... | 179/100.4 ST |

*Primary Examiner*—Raymond F. Cardillo, Jr.
*Attorney*—Louis Bernat

[57] ABSTRACT

A cutting and recording system comprises a first reproducing magnetic head for reproducing a signal from a magnetic tape. A second reproducing magnetic head is disposed at a position preceding the first reproducing magnetic head in a running direction of the tape. Means are provided for detecting the level of the signal reproduced from the second reproducing head. Means are provided for angle modulating a carrier responsive to a signal reproduced from the first reproducing head. The level of this angle modulated carrier is controlled by the output of the signal from the second head. The output signal from the level controlling means and a direct wave signal are multiplexed. A cutting and recording of the multiplex signal is made on a record disc. The level of the carrier of the angle modulated wave is superposed upon the direct wave signal and cut and recorded on the same sound groove. This level is controlled in response to the level of the direct wave signal.

9 Claims, 15 Drawing Figures

INVENTOR.
ISAO OHWAKI
BY Louis Bernat
ATTORNEY

INVENTOR.
ISAO OHWAKI
BY
Louis Bernal
ATTORNEY

INVENTOR.
ISAO OHWAKI

BY Louis Bernat

ATTORNEY

INVENTOR
ISAO OHWAKI
BY Louis Bernat
ATTORNEY

INVENTOR
ISAO OHWAKI
BY Louis Bernat
ATTORNEY

INVENTOR.
ISAO OHWAKI
BY Louis Bernat
ATTORNEY

SYSTEM FOR CUTTING AND RECORDING ON A RECORD DISC

This invention relates to a system for cutting and recording a signal on a record disc and more particularly to a system for cutting and recording a multiplex signal consisting of a direct wave signal and an angle modulated signal on a record disc.

The co-pending U.S. Pat. application Ser. No. 92,803 filed Nov. 25, 1970, now U.S. Pat. No. 3,686,471 entitled "SYSTEM FOR RECORDING AND/OR REPRODUCING FOUR CHANNEL SIGNALS ON A RECORD DISC," shows a system for recording four channel signals on two walls of a single sound groove by making a sum signal and a difference signal from each two channels and superposing the angular modulated difference signal upon the direct wave sum signal for recording them on one wall of the sound groove.

In this proposed recording system for a four channel record, the output level of the angle modulated wave signal is maintained constant, irrespective of the level of the direct wave signal, during cutting and recording. The above described recording system, however, has now been found to have the following problems. (1) When the direct wave signal is at a low level, a modulated wave signal is cut and recorded at an unnecessary level. As a result, a superflouous cutter current flows, and the heating of the cutter increases. In order to cool off this heat, a special type of gas cooling means must be employed. This inevitability makes the apparatus large and expensive. (2) The level of the angle modulated wave signal should preferably be limited to the minimum, from the standpoints of compatibility with a conventional two channel record and resistance to wear of the record. However, a mere reduction in the level of the angle modulated wave signal increase a disturbing noise. Accordingly, such a mere reduction is not a proper approach to the problem.

The system according to this invention is proposed to solve the above described problems.

It is a general object of the invention to overcome the above described problems and provide a novel and useful system for cutting and recording the multiplex signal on a record disc.

Another object of the invention is to provide a system for cutting and recording the multiplex signal on a record disc, with the level of the modulated carrier signal controlled in response to a level of the direct wave signal exceeding a certain predetermined frequency. The signal recorded on the record disc, by the system according to the invention, can be reproduced without distortion or noise, so that the signal to noise ratio is improved. Further, the resistance to wear of the record is improved, and heating of the cutter can be avoided.

A further object of the invention is to provide a cutting and recording system which is suited for a four channel record cutting and recording system. The sum signals and difference signals of each two channels are formed from four channel signals. Multiplex signals of the difference signals are angle modulated, and the direct wave sum signals are cut and recorded on a record disc.

Other objects and features of the invention will become apparent from the description made hereinbelow with reference to the accompanying drawings, in which.

Figure 4:
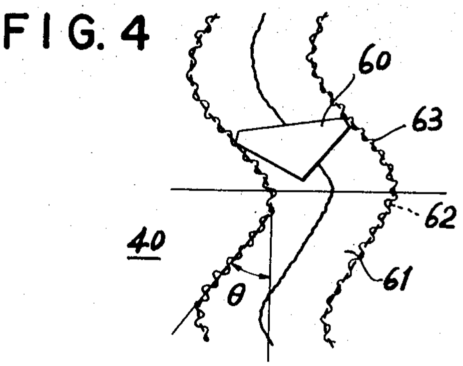
Figure 5:
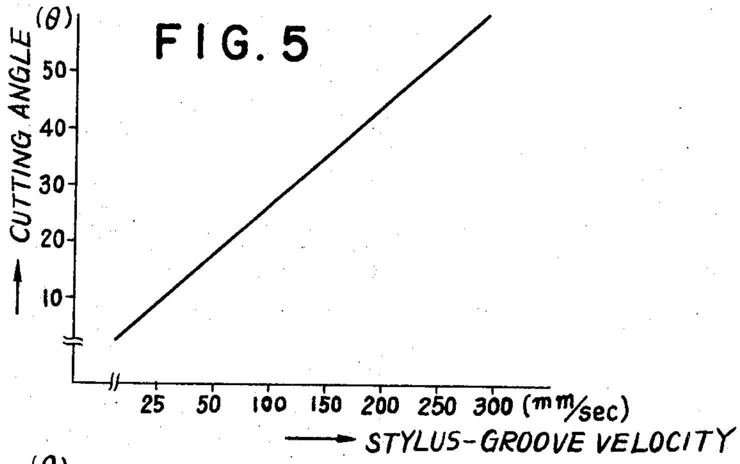
Figure 6:
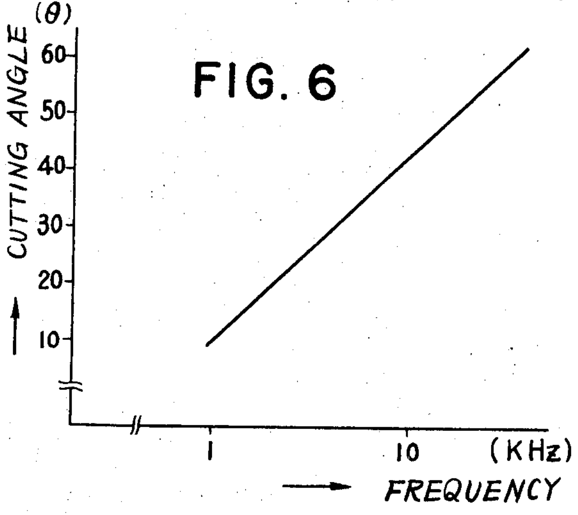
Figure 7:
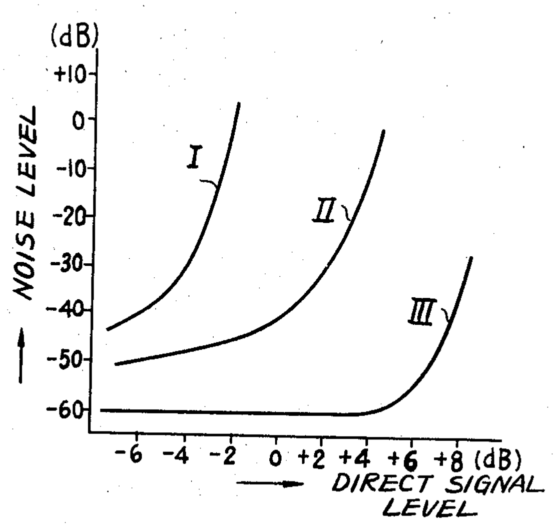
Figure 8:
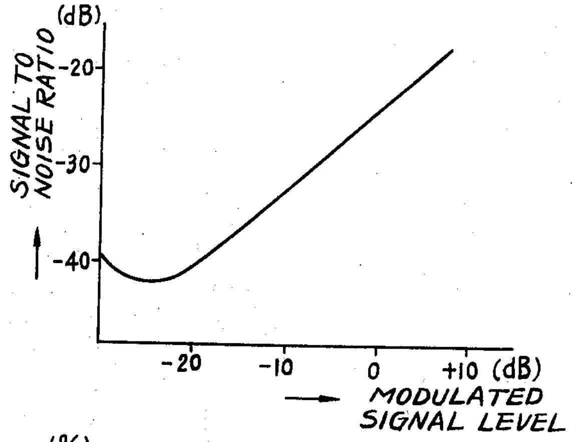
Figure 9:
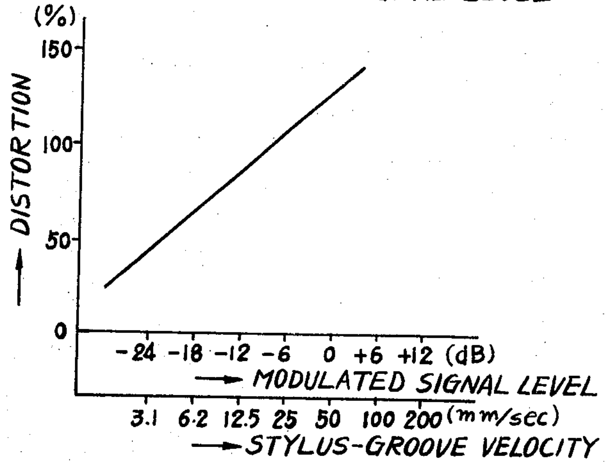
Figure 10:
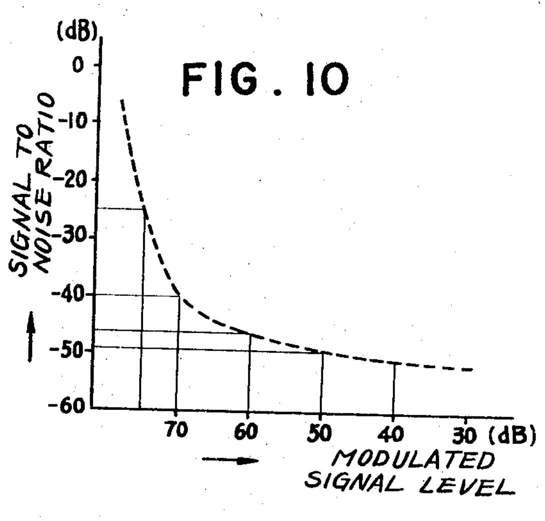
Figure 12A:
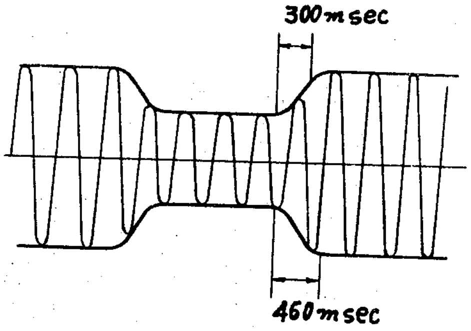
Figure 12B:
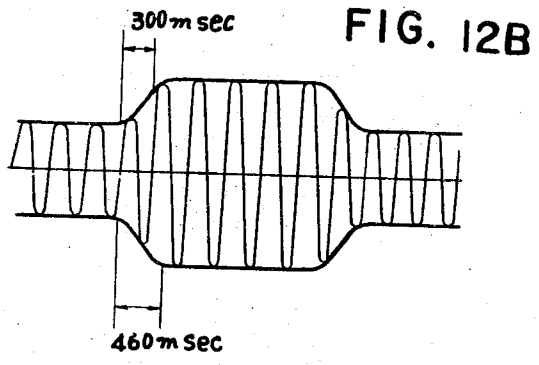
Figure 11A:
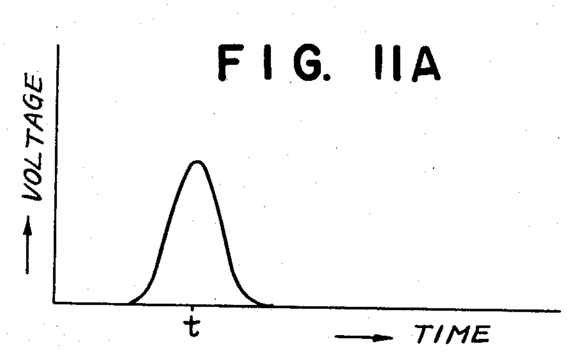
Figure 11B:
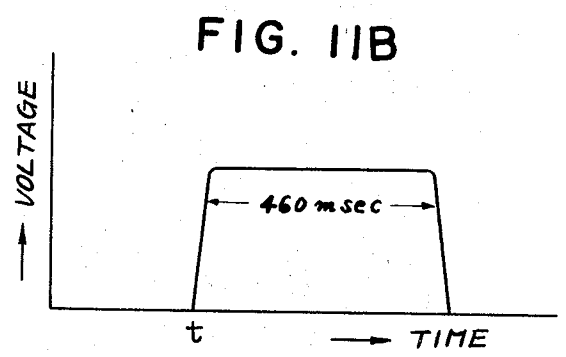
Figure 11C:
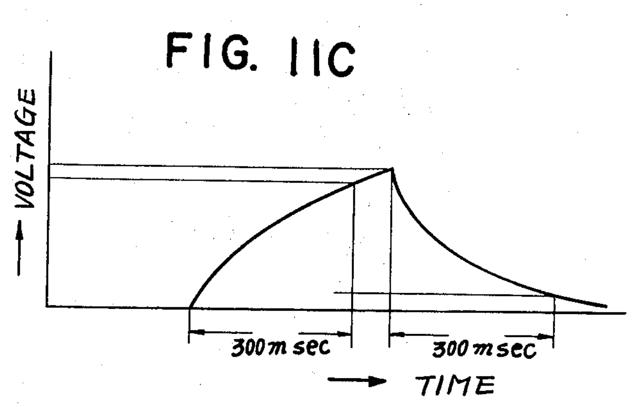

FIG. 4 symbolically shows a sound groove cut and recorded by a cutting stylus on the record disc;

FIG. 5 is a graphic diagram showing a relationship between the stylus-groove velocity and cutting angle;

FIG. 6 is a graphic diagram showing a relationship between frequency and cutting angle;

FIG. 7 is a graphic diagram showing a relationship between level of the direct wave signal and level of disturbing noise;

FIG. 8 is a graphic diagram showing a relationship between modulated wave signal level and a signal to noise ratio;

FIG. 9 is a graphic diagram showing a relationship between the stylus-groove velocity and distortion;

FIG. 10 is a graphic diagram showing a relationship between the level of a modulated wave signal and the signal to noise ratio of a demodulated wave signal;

FIGS. 11A to 11C respectively show voltage waveforms in each part of the level discriminating circuit; and FIGS. 12A and 12B show waveforms of output signals from the level control circuit.

First, one embodiment of the system, according to the invention, will be described with reference to FIG. 1. A master magnetic tape 10, on which four channel signals are recorded, is driven and run in the direction of arrow A by a capstan 11 and a pinch roller 12. An auxiliary reproducing magnetic head 13 and a main reproducing magnetic head 14 are provided along the path of travel of the magnetic tape 10. The auxiliary head 13 is located at a position which is spaced away from the main head 14 by a distance *l* and precedes the main head 14 in the direction of advancement of the magnetic tape 10. The distance *l* is selected at, for instance, 65 millimeters. If the distance *l* is converted into time, the converted value is 460 millisec., at a tape velocity of 1/2.7 times the normal recording velocity (38 cm/sec.).

A first channel signal CH 1, which is reproduced from the magnetic tape 10 by the auxiliary head 13, is supplied to a reproducing amplifier 15. At the same time, a second channel signal CH 2, which is reproduced by an auxiliary head (not shown) provided for the second channel, is also supplied to the reproducing amplifier 15 in which the two signals are added together. The signal amplified in the reproducing amplifier 15 is adjusted in its gain at a gain adjuster 16, and then it is supplied to a flat amplifier 17 for amplification. The output from the flat amplifier 17 is supplied to a high-pass filter 18 which allows frequencies exceeding 8 KHz to pass and attenuates frequencies below 8 KHz, at a rate of 12 dB/oct. The signal filtered out by the high-pass filter 18 is adjusted in its gain at a gain adjuster 19. Then the signal is amplified in a flat amplifier 20 and is supplied to a DC converting circuit 22 of a level discriminating circuit 21 enclosed by a broken line in the figure.

The level discriminating circuit 21 includes the DC converting circuit 22, a time delay circuit 23, a time constant circuit 24, and a level adjuster 25. The signal supplied to the DC converting circuit 22 is a rectified and AC waveform and converted into direct current. The time delay circuit 23 operates so that its gate switches ON when an applied DC voltage has reached a predetermined level and switches OFF after a period of 460 mm sec. elapses. Accordingly, the time delay circuit 23 is maintained in the ON state during 460 millisec. as shown in FIG. 11B, even if the applied DC voltage does not persist that long.

The output signal from the time delay circuit 23 is supplied to the time constant circuit 24, which reaches 90 percent of its buildup and 90 percent of its breaking characteristics during 300 millisec. The output signal from the time constant circuit 24 is set at a predetermined level by the level adjuster 25. Then, it is supplied to the carrier level control circuit 26, enclosed by a broken line in the figure.

Figure 2:
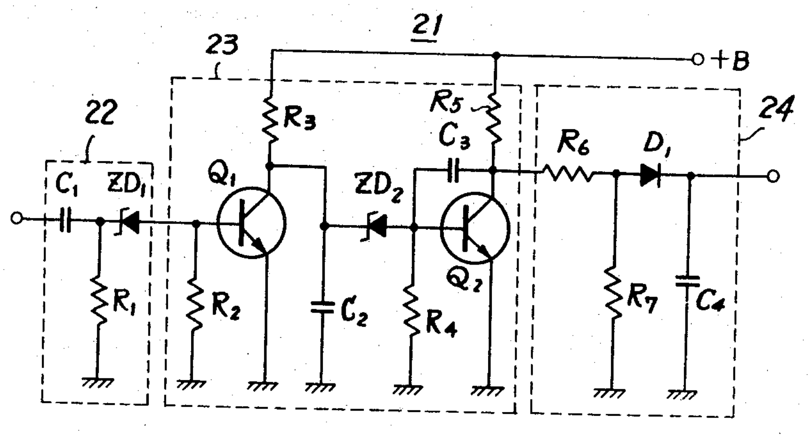
FIG. 2 is an electric circuit diagram of one embodiment of the level discriminating circuit provided in the system shown in the block diagram of FIG. 1.

An electric circuit diagram of one concrete embodiment of the above described level discriminating circuit 21 is shown in FIG. 2. The DC converting circuit 22 includes a Zener diode $ZD_1$, a capacitor $C_1$, and a resistor $R_1$. The time delay circuit 23 includes transistors $Q_1$ and $Q_2$, a Zener diode $ZD_2$, capacitors $C_2$ and $C_3$ and resistors $R_2$ to $R_5$. The time constant circuit 24 comprises a capacitor $C_4$, resistors $R_6$ and $R_7$, and a diode $D_1$.

The first channel signal CH1 (FIG. 1) is reproduced by the main head 14, amplified at a reproducing amplifier 27, and supplied to a matrix circuit 28. At the same time, the second channel signal CH 2, is reproduced by a main head (not shown) for the second channel, and supplied to the matrix circuit 28. The first and second channel signals CH 1 and CH 2 are combined in the matrix circuit 28 to produce a sum signal (CH 1 + CH 2), having a bond of 30 Hz to 15 KHz. The sum signal (CH 1 + CH 2) is supplied from the matrix circuit 28 through a delay circuit 29 to a mixer 30. The delay matches the sum signal, in time, with phase modulated difference signal to be described later.

The difference signal (CH 1 − CH 2) from the matrix circuit 28 is supplied to a phase modulator 31 in which it is phase modulated to have a band of 20 KHz to 50 KHz. The band of the phase modulated difference signal is higher than the band of the aforementioned direct wave sum signal. The output phase modulated difference signal from the phase modulator 31 is supplied to the carrier level control circuit 26. In this circuit, the phase modulated difference signal is adjusted in its level at a level adjuster 32. The phase modulated difference signal which has passed through the level adjuster 32, is supplied through a resistor 33 and a capacitor 34 to a flat amplifier 35 for amplification.

A control element circuit 36, of the carrier level control circuit 26, changes its AC impedance due to the output signal supplied thereto from the level discriminating circuit 21. A contact *a* of a switch 37 is connected to a connecting point 41 between a resistor 33 and a capacitor 34. A contact *b* is connected directly to a flat amplifier 35. In the present embodiment, a movable contact member of the switch 37 is shown as making contact with the contact *a*, so that the control element circuit 36 is connected between the connecting point 41 and the ground. The AC impedance of the control element circuit 36 changes in response to the output signal from the level discriminating circuit 21.

As the AC impedance of the control element circuit 36 changes, the level of the carrier of the output phase modulated difference signal from the flat amplifier 35 changes. In the present embodiment, if the level of the signal discriminated in the level discriminating circuit 21 is high, the level of the modulated carrier is lowered, as shown in FIG. 12A. In this case, 90 percent of the building up (or breaking) time is 300 milli-sec. and 100 percent of the building up (or breaking) time is 460 milli-sec. This time constant is 1/2.7 times as large as the aforementioned value, in which cutting and recording are actually effected.

If it is desired to control the level of the modulated carrier so as to increase when the level of the output signal from the level discriminating circuit 21 is high, the movable contact member of the switch 37 is connected to the contact *b*. In this case, switch 37 connects the control circuit 36 to the flat amplifier 35. The output phase modulated wave of the level control circuit 26 in this case is as shown in FIG. 12B.

Figure 3:
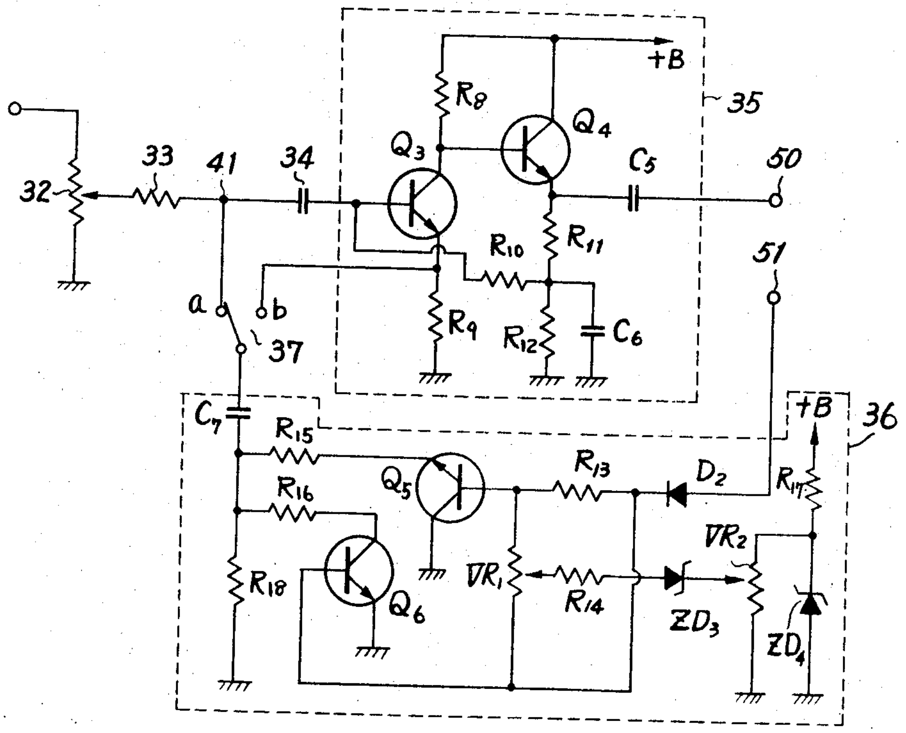
FIG. 3 is an electric circuit diagram of one embodiment of the carrier level control circuit provided in the system shown in the block diagram of FIG. 1.

An electric circuit diagram of one concrete embodiment of the level control circuit 26 is shown in FIG.3. The flat amplifier 35 includes transistors $Q_3$ and $Q_4$, resistors $R_8$ to $R_{12}$, and capacitors $C_5$ and $C_6$. The contact *b* of the switch 37 is connected to the emitter of the transistor $Q_3$. The output signal from the flat amplifier 35 is transmitted from the emitter of the transistor $Q_4$ and through the capacitor $C_5$ to the terminal 50. The control element circuit 36 includes transistors $Q_5$ and $Q_6$, resistors $R_{13}$ to $R_{18}$, variable resistors $VR_1$ and $VR_2$, a capacitor $C_7$, a diode $D_2$, and Zener diodes $ZD_3$ and $ZD_4$. The signal from level discriminating circuit 21 is applied to a terminal 51 and transmitted through the diode $D_2$ to the base of the transistor $Q_5$, via the resistor $R_{13}$, and directly to the base of the transistor $Q_6$. The variable resistor $VR_1$ functions as a balancer, and the variable resistor $VR_2$ performs a function of bias adjustment.

Figure 1:
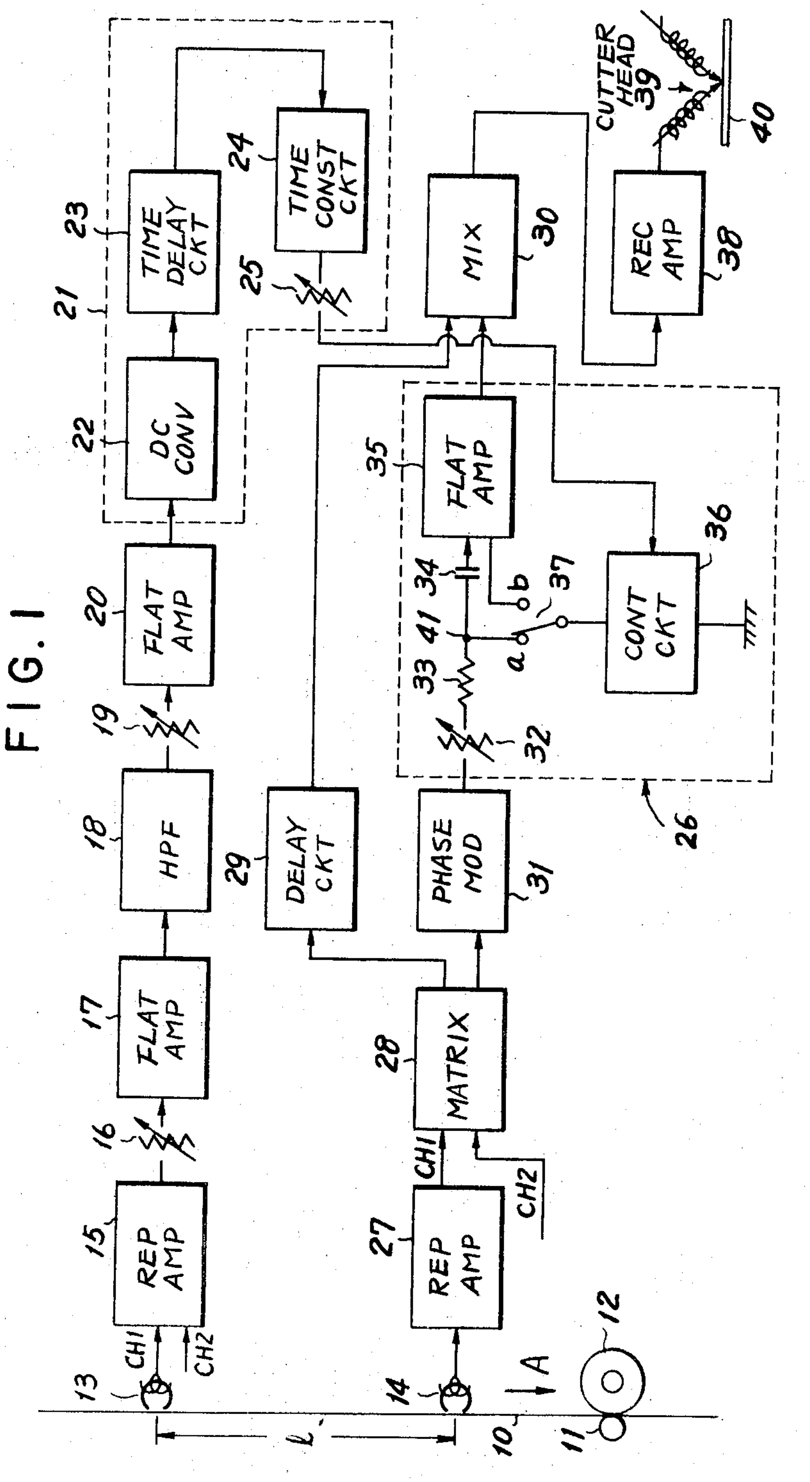
FIG. 1 is a block diagram showing one embodiment of the cutting and recording system, according to the invention.

The phase modulated difference signal has a modulated carrier which has been controlled in its phase, in the level control circuit 26 (FIG. 1). The resultant signal is supplied to the mixer 30. Simultaneously, the direct wave sum signal is supplied from the delay circuit 29 to the mixer 30. The direct wave sum signal and the phase modulated difference signal, which have been multiplexed in the mixer 30, are amplified in a recording amplifier 38. Then, they are supplied to a cutter head 39 of a cutting machine. The cutting stylus of the cutter head 39 is driven by this signal to cut a sound groove by a 45—45 system on a record disc 40. This makes a recording on one wall of the groove.

The third and fourth channel signals are recorded by the same circuit system as described above in connection with FIG. 1; although, illustration thereof is omitted. The output multiplex signal from this system is also applied to the cutter head 39 and is recorded on the other wall of the sound groove cut on the record disc 40.

Nextly, a principle of an operation of the system according to the invention (as embodied in the block diagram shown in FIG. 1) will be described with reference to FIG. 4 and the subsequent figures.

FIG. 4 illustrates a sound groove 61 cut on the record disc 40 by a cutting stylus 60 of the cutter head 39, in the manner described above. The cutter head 39 is driven, as described above, by the multiplex signal comprising the direct wave sum signal of 30 Hz to 15 KHz.

The phase modulated difference signal of 20 KHz to 50 KHz also drives head 39. The sound groove 61 thus cut has a configuration which is formed by superposing a small waveform made by the phase modulated wave signal, as shown by a full line 63 on a large waveform formed by the direct wave signal, as shown by a broken line 62.

As the frequency of the direct wave signal increases, a cutting angle $\theta$ of the cutting stylus 60 increases, as shown in FIG. 6. The angle $\theta$ is made between the direction of advancement of the cutting stylus 60 no signal is applied to the cutter head 39 and the waveform relative to the direct wave signal. Also, as the stylus-groove velocity increases, the cutting angle $\theta$ increases as shown in FIG. 5. As will be apparent from FIG. 4, if the cutting angle $\theta$ becomes large, the cutting of the phase modulated wave superposed on the sound groove waveform of the direct wave signal becomes difficult. Accordingly, discrimination of the frequency becomes necessary due to this disc cutting and recording condition. For this purpose, frequency discrimination is made in the present embodiment by the high-pass filter 18 (FIG. 1), and the control signal for level control is obtained from a signal having a frequency of over 8 KHz.

FIG. 7 shows a relationship between the level of the direct wave signal and the level of the disturbing noise when the frequency of the direct wave signal is constant (8 KHz), taking the level of the modulated carrier as a parameter. In this figure, curves I, II and III respectively show the aforementioned relationship in case that the level of the modulated carrier is −10, 0 and +10 dBm, respectively. As will be apparent from the same figure, if the level of the direct wave signal is high and the level of the modulated carrier is relatively low, the modulated carrier signal is modulated by the direct wave signal, whereby the disturbing noise increases. Conversely, if the level of the direct wave is low and the level of the modulated carrier is relatively high, the degree of the disturbing modulation is relatively small and the level of the disturbing noise decreases. Accordingly, in order to reduce the disturbing noise which occurs due to modulation of the modulated carrier signal by the direct wave signal, the level of the modulated carrier signal should be made as high as possible.

It is to be noted, however, that, as shown in FIG. 9, the increase in the level of the modulated carrier signal is accompanied by an increase in distortion, which occurs due to mistracing of a reproducing stylus. This increases the phase difference between the direct wave signal and the modulated carrier signal. Accordingly, it is desirable to make the level of the modulated carrier signal as high as possible, in so far as the condition shown in FIG. 7 is concerned. However, it is not desirable to make the level of the modulated carrier signal too high, if the relationship as shown in FIG. 9 is considered. It is, therefore, necessary to satisfy both of these mutually contradictory conditions.

FIG. 8 which shows a relationship between a recording level of the modulated carrier signal and the signal to noise ratio of a reproduced signal from a record disc which has been played fifty times. A test result shows that if the level of the modulated carrier is high, noise modulation is likely to occur, resulting in an increase in noise and deterioration of the signal to noise ratio.

In the present embodiment, the output from the high-pass filter 18 (FIG. 1) is supplied, as described previously, to the level discriminating circuit 21. The AC waveform is rectified and used as a control voltage. From the relationship between the stylus-groove velocity and the cutting angle, the cutting angle $\theta$ (FIG. 4) increases in proportion to the amplitude of the direct wave signal. In the level control circuit 26, the level of the modulated signal supplied from the phase modulator 31 is controlled by the control voltage, which varies in accordance with the level of the direct wave signal from the level discriminating circuit 21. If the level (amplitude) of the direct wave signal increases, the level of the modulated carrier signal is reduced, as shown in FIG.12A. This reduction occurs in the level control circuit 26 to the extent that the form of the groove of this direct wave signal does not adversely affect the form of the groove of the modulated carrier signal. Conversely, if the direct wave signal falls to a low level or a low frequency range, the level of the modulated carrier signal is controlled so that it will rise to a limit at which reproduction is possible.

FIG. 10 shows a relationship between the level of the modulated carrier, which appears on playback of the record disc, and the signal to noise ratio after the demodulation of the carrier. The reproduced output of the cartridge is normally within a range between 40 and 50 dB. Accordingly, the signal to noise ratio falls within a range from −50 to −60 dB.

In case the carrier signal level is raised as shown in FIG.12B, when the level of the direct wave signal falls below a predetermined level, the movable contact member of the switch 37 is connected to the contact *b*, as previously described. In this case, the level of the modulated carrier is raised, by a setting of the control element circuit 36 and the variable resistor 32 etc., to the limit at which reproduction is possible. Thus, an improvement of the signal ratio is attained.

If the level of the modulated carrier signal is abruptly changed in response to an abrupt change of the direct wave signal, noise modulation is likely to occur when the signal is reproduced. Accordingly, the level discriminating circuit 21 and the level control circuit 26 are constructed to have certain time constants, which slows the building up and breaking performances in these circuits. Further, since the auxiliary head 13 is provided at a position preceding the main head 14 by the distance *l*, the level can be previously controlled, before the abrupt change of the direct wave signal.

The cutting and recording system according to the invention has the following advantages:

1. The configuration of the groove formed by the modulated wave signal does not interfere with the configuration of the groove formed by the direct wave signal. Consequently, disturbances and distortions to the modulated carrier signal due to the direct wave signal are reduced.

2. Noise is reduced and the signal to noise ratio is improved. This noise reduction effect is particularly remarkable when the reproducing stylus traces a soundless groove (a lead-in groove or a lead-out groove), on which no direct wave signal is recorded.

3. Wear resistance of the record disc is improved.

4. An undesirable heating of the cutter during cutting and recording is prevented.

While the invention has been described with reference to the specific and preferable embodiment, various modifications and variations thereof will be apparent to those skilled in the art without departing from the scope of which is set forth in the appended claims.

What I claim is:

1. A system for cutting and recording on a record disc comprising means including first and second reproducing magnetic heads for reproducing a signal from a magnetic tape running in one direction, said second reproducing magnetic head being disposed at a predetermined position preceding said first reproducing magnetic head with respect to the running direction of said tape, means for angle modulating a carrier responsive to the signal reproduced by said first reproducing magnetic head, means for detecting the level of the signal reproduced by said second reproducing magnetic head, means responsive to the level detecting means for controlling the level of the carrier modulated by said angle modulating means, mixing means for mixing and multiplexing the direct wave signal reproduced by said first reproducing magnetic head and the level controlled angle modulated wave signal, and means for cutting and recording the output multiplex signal from said mixing means on a record disc.

2. The cutting and recording system as defined in claim 1 wherein said level control means reduces the level of the carrier responsive to the output of said level detecting means when the detected level is high.

3. The cutting and recording system as defined in claim 1 wherein said level control means increases the level of the carrier responsive to the output of said level detecting means when the detected level is high.

4. The cutting and recording system as defined in claim 1 wherein said level control means comprises a flat amplifier which amplifies the carrier modulated by said angle modulating means, and a control element circuit means connected between the input side of said amplifier and ground, said control element circuit means changing its AC impedance responsive to the detected output of said level detecting means.

5. The cutting and recording system as defined in claim 1 wherein the passing band of said high-pass filter is substantially over 8 KHz.

6. The cutting and recording system as defined in claim 1 further comprising a high-pass filter for passing and obtaining middle and high frequency signals exceeding a predetermined frequency, said signals being taken from the signal reproduced by said second reproducing magnetic head, and wherein said level detecting means detects the level of the signal filtered through said high-pass filter.

7. The cutting and recording system as defined in claim 6 wherein said level detecting means comprises DC converting circuit means responsive to the output signal of said high pass filter for producing a direct current signal, time delay circuit means operative in response to the level of said direct current signal which exceeds a predetermined level for producing a pulse signal having a predetermined pulse width, and time constant circuit means having a predetermined time constant for producing a waveform signal having predetermined rising and falling characteristics in response to said pulse signal, and means wherein said level controlling means controls the level of the carrier in response to said waveform signal.

8. A system for cutting and recording on a record disc comprising first and second signal reproducing means including two individually associated reproducing magnetic heads for reproducing respective channel signals from a magnetic tape running in one direction , four channel signals being recorded on said tape , said magnetic head of said second signal reproduding means being disposed at a predetermined position preceding said magnetic head of said first signal reproducing means with respect to the running direction of said tape, matrixing means for matrixing two channel signals of the channel signals reproduced from said first signal reproducing means to form sum signals and difference signals, means for angle modulating a carrier responsive to the output difference signal from said matrixing means, means for detecting the level of the signal reproduced from said second signal reproducing means, means responsive to said level detecting means for controlling the level of the carrier modulated by said angle modulating means, mixing means responsive to said level control means for mixing and multiplexing the angle modulated difference signal and the output direct wave sum signal from said matrixing means, and means for cutting and recording the output multiplex signal from said mixing means on a record disc.

9. A system for cutting and recording on a record disc comprising means for transporting a four track magnetic tape in one direction, four channel signals being respectively recorded on said four tracks, four pairs of first and second magnetic heads individually associated with said four tracks for reproducing the four channel signals from the four magnetic tracks respectively, each pair comprising first and second magnetic heads disposed at predetermined positions on the individually associated track, said positions being such that each second magnetic head precedes the paired first magnetic head with respect to said one direction, first matrixing means for matrixing two channel signals from among the four channel signals reproduced by said first magnetic heads to form a first sum signal and a first difference signal, second matrixing means for matrixing the other two channel signals from among the four channel signals reproduced by said first magnetic heads to form a second sum signal and a second difference signal, first modulator means for angle modulating a carrier responsive to the first difference signal to produce a first angle modulated signal, second modulator means for angle modulating the carrier responsive to the second difference signal to produce a second angle modulated signal, first adding means for adding together two channel signals from among the four channel signals reproduced by said second magnetic heads, the added two channel signals respectively corresponding to the two channel signals matrixed by said first matrixing means, second adding means for adding together the other two channel signals from among the four channel signals reproduced by said second magnetic heads, first detector means for detecting the level of the output signal of said first adding means, second detector means for detecting the level of the output signal of said second adding means, first controlling means responsive to said first detector means for controlling the level of the carrier modulated by said first modulator means, second controlling means responsive to said second detector means for controlling the level of the carrier modulated by said second modulator means, first mixing means responsive to said first controlling means for mixing and multiplexing the first angle modulated signal and the first sum signal to produce a first multiplex signal, second mixing means responsive to said second controlling means for mixing and multiplexing the second angle modulated signal and the second sum signal to produce a second multiplex signal, and means for cutting and recording the first multiplex signal on one wall of a groove of a record disc and the second multiplex signal on the other wall of the groove.

* * * * *